Figure 1:
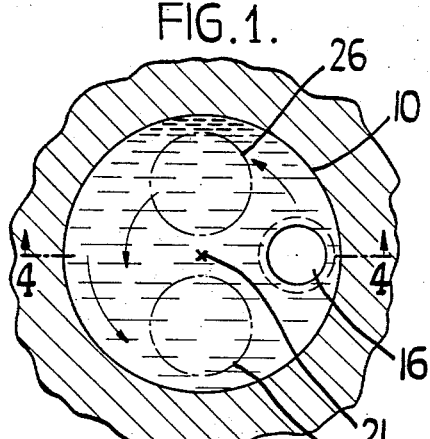

March 26, 1968 — G. HELD — 3,374,774
SUPERCHARGED OTTO GAS ENGINES
Filed Jan. 20, 1966

INVENTOR
Gerhard Held
by Greer Maréchal Jr
his attorney

United States Patent Office 3,374,774
Patented Mar. 26, 1968

3,374,774
SUPERCHARGED OTTO GAS ENGINES
Gerhard Held, Augsburg, Germany, assignor to Maschinenfabrik Augsburg-Nuremburg A.G., Augsburg, Germany, a corporation of Germany
Filed Jan. 20, 1966, Ser. No. 521,856
Claims priority, application Germany, Jan. 26, 1965, M 63,929
14 Claims. (Cl. 123—30)

This invention relates to supercharged Otto gas engines and, more particularly, to such engines constructed and operated in a manner to give good efficiency as Otto engines while being readily converted to diesel cycle operation with either oil or gaseous fuel.

With the ever increasing use of Otto engines in clear gas plants and in regions having supplies of natural gas, it may be desired and quite advantageous or important to have a single supercharged four-stroke reciprocating internal combustion engine construction which can be simply and readily converted from diesel-oil to diesel-gas operation and further to Otto-gas operation.

If it is attempted, however, to use a diesel engine construction for Otto gas operation up to the maximum effective cylinder pressures permitted for diesel operation of the engine (in order to obtain the greatest efficiencies and power output), serious damage to the engine, particularly in continuous operation, may result because of the hard or explosive or "knocking" type of combustion characteristic of the Otto cycle. Actually, as is well known, for the foregoing reasons, Otto gas engines suitable for an effective pressure range of about 10 to 12 kg./cm.$^2$ and above may have to be constructed as solidly or massively as diesel engines with about a 50% higher effective pressure capacity. Also, particularly with engines designed for such effective pressure ranges, it may also be necessary to extend the detonation point by expensive additional supercharger cooling means.

According to this invention, however, such disadvantages can be avoided or minimized, by providing engine constructions and methods of operation whereby a preliminary ignition flame of a relatively large area is formed at the periphery of the cylindric main combustion chamber in a small portion of the combustible mixture somewhat removed from the main cylinder charge prior to igniting the main quantity of the cylinder charge mixture, and simultaneously maintaining a strong or rapid spinning or swirling of the charge mixture in the cylinder so that the preliminary flame spreads as an annular flame around the cylinder wall. As a further feature of this invention, and particularly in the case of engines having large cylinder diameters, there is also provided an additional ignition point or spark plug centrally of the cylinder head so arranged that it can be ignited sequentially or, at least, at different times and/or an additional peripheral flame-producing device, situated diametrical to the first one.

With the foregoing and additional objects in view, this invention will now be described in more detail, and these and other objects and advantages will be apparent from the following description, the accompanying drawings, and the appended claims.

Figure 2:
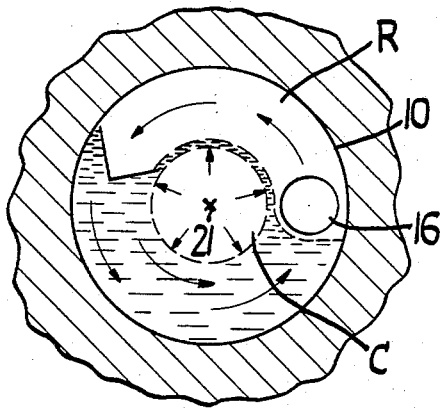
Figure 3:
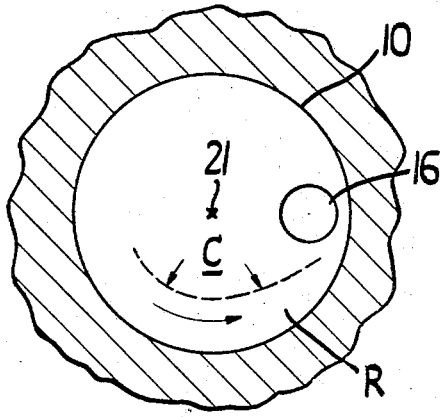
Figure 4:
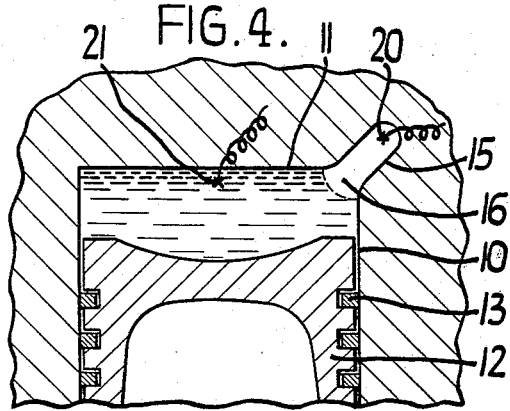
Figure 5:
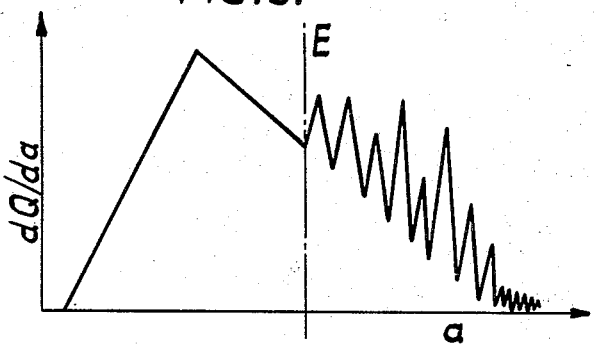
Figure 6:
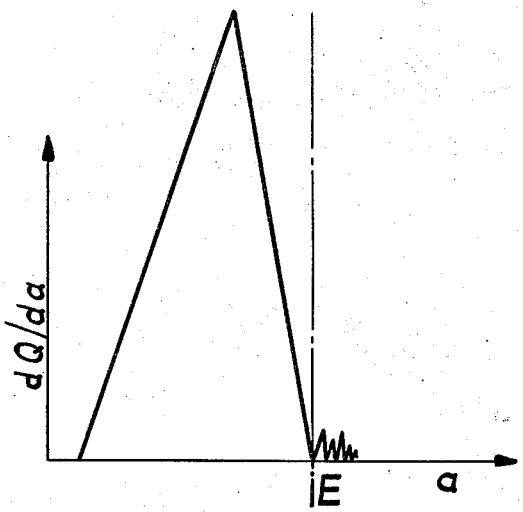

In the drawings:
FIGS. 1 to 3 are schematic or diagrammatic top views of the main combustion chamber of a cylinder of an engine embodying and for practising this invention at three different and progressing moments of time in the course of the combustion of the gas-air cylinder charge mixture, the unignited combustible mixture being indicated in each case by hatching;
FIG. 4 is a schematic or diagrammatic vertical section through the engine cylinder at the time shown in FIG. 1 and along the line 4—4 thereof;
FIG. 5 is a graphic representation of the rate of heat release in conventional Otto gas engine operation; and
FIG. 6 is a graphic representation, similar to FIG. 5, of the rate of heat release in an engine embodying and for practising this invention.

Referring to the drawings, in which like reference characters refer to like parts throughout the several views thereof, there is shown an internal combustion engine cylinder 10, having a cylinder head 11, and piston 12, with piston rings 13, reciprocating in cylinder 10 in known manner.

Arranged peripherically of cylinder 10 and in the cylinder head thereof extending upwardly and outwardly therefrom are one or more ignition chambers 15 communicating directly with the main combustion space in cylinder 10 through an open port 16. While only one such ignition chamber 15 is shown in the drawings here for simplicity, additional and substantially identical ones thereof may also be provided, particularly in larger cylinder diameters than as noted below, around cylinder 10 and, preferably, substantially evenly spaced therearound. Each of such ignition chambers 15 is substantially cylindrical in shape and widens or flares outwardly at port 16 communicating with the main combustion space in cylinder 10. Preferably, the volume of ignition chamber 15 is about 1% to 2% of the volume of cylinder 10 at maximum compression by piston 12.

In each ignition chamber 15 and at the extreme outer end thereof is provided a spark plug indicated at 20. Except in engines with relatively small cylinder diameters, there is also preferably provided an additional spark plug indicated at 21 centrally of cylinder head 11 in the main combustion space of cylinder 10. Spark plugs 20 and 21 (as well as additional spark plugs such as 20 in any additional ignition chambers 15 around cylinder 10) are wired, in perfectly well known and conventional manner, so that the individual spark plugs can be fired selectively either simultaneously or individually in a predetermined sequence. Also, all spark plugs 20 and 21, by contrast to conventional practice, are preferably arranged with the electrodes thereof extending further than usual into the combustible mixture to be ignited so that the spark gaps of plugs 20 and 21 are completely and copiously surrounded on all sides by combustible mixture. That is, for optimum operating results in accordance herewith, the combustible mixture preferably has a higher than usual combustion air ratio, thus requiring quite a strong spark for the desired ignition conditions.

Also arranged in cylinder head 11 and the upper portion or cylinder 10 are conventional valve-controlled inlet and exhaust ports indicated (quite diagrammatically in FIG. 1) at 25 and 26. In order to produce a very strong swirling or rotating movement of the combustible gas mixture within cylinder 10 (to obtain, preferably, desirably five times the ignition velocity) conventional swirl producing means (as well known and understood for this purpose) are provided in inlet port 25. Such swirl screens are arranged to provide for rotating or swirling of a combustible mixture in cylinder 10 preferably in the counter clockwise direction indicated by the curved arrows in FIG. 1, and this direction of rotation with respect to the disposition of ignition chamber 15 relative to exhaust valve 26 and inlet valve 25 is of significance in accordance with this invention and preferably in the manner shown in FIG. 1. That ist. the direction of rotation of the swirling combustion mixture should carry the flame front from ignition chamber 15 first past hot exhaust valve 26, and fresh combustible mixture from inlet port 25, first past flame producing device 15/16 for better scavenge of space 15.

With the foregoing in view, it may now be generally noted that the combustion technique in accordance herewith, although described in more detail below, relates to the preliminary or premature ignition by spark plug 20 of a small quantity of the combustible mixture in ignition chamber 15 and somewhat removed from the main quantity of combustible mixture in the main combustion space of cylinder 10, with propagation of the flame from ignition chamber 15 through port 16 and into the periphery of main combustion space. The quantity of combustible mixture thus preliminarily ignited in ignition chamber 15 is relatively so small that the amount of heat generated leaves the main quantity of combustible mixture in cylinder 10 substantially unaffected until the actual emergence of the flame front from ignition chamber 15 through port 16.. Thus, the actual ignition of the main quantity of the combustible mixture in cylinder 10 is accomplished by a flame front of relatively large area emerging from port 16, rather than merely by the almost point source of a spark plug.

In larger engines in accordance herewith which also include spark plug 21 in the main combustion space in cylinder 10, this spark plug is not fired until the flame front enters the main combustion space through port 16, at which time the main quantity of the combustible mixture is ignited by the joint action of both spark plug 21 and the large area advancing flame front from port 16. Because of the large area of the flame front from port 16 and the rapid advance thereof as accelerated by the swirling motion of the combustible mixture in cylinder 10 and the further ignition acceleration directly from firing spark plug 21, all as described in more detail below, the combustion is accomplished very quickly and so as actually to precede the "knocking" characteristically occurring during the combustion phase of an Otto gas engine cycle. These provisions also permit the utilization of a combustion air ratio considerably higher than usual and, indeed, virtually within the range of the ignition limit, primarily because the loss of ignition velocity produced by increasing the combustion air ratio is highly exceeded by the strong swirling movement of the mixture. Thus, the natural tendency of the mixture to "knock" is reduced by the higher combustion air ratio, as well understood and in accordance with known chemical laws.

As will be apparent from the foregoing, when piston 12 approaches upper dead center of the compression stroke, spark plug 20 in ignition chamber 15 is fired, igniting a small quantity of combustible mixture contained therein and producing a flame front which moves down ignition chamber 15 through port 16 into the main combustion space at cylinder 10. Because of the flaring or enlarging of ignition chamber 15 at port 16, a flame front of relatively large surface area is produced which spreads rapidly due to the strong swirling action of the combustible mixture in cylinder 10 so as to form an annular advancing flame as indicated at R of FIG. 2. As will be understood, the higher the speed of swirling or rotating of the combustible mixture in cylinder 10, the less the annular flame R is distorted. The hot burned gas in the receded space 15 guarantees permanent ignition of fresh combustible mixture at opening 16, provided by the swirl, thus making it possible to realize the so called annular flame.

With the arrangement of ports 16 from ignition chambers 15 at the periphery of cylinder 10, the annular flame R tends to cling to the periphery of cylinder 10, thereby removing possible residues of combustible mixture around the extreme periphery of the cylinder. As noted above, the volume of ignition chamber 15 is about 1% to 2% of the compressed volume of the main combustion space of cylinder 10 at the time of ignition, and, as will be understood, the length and diameter of ignition chamber 15 will vary depending upon the particular dimensions of cylinder 10, but can readily be determined in accordance with the teachings hereof for any given cylinder. Thus the length of ignition chamber 15 from spark plug 20 to port 16 is such that permanent ignition is guaranteed and very precise control of time of emergence of the flame from port 16 into the main combustion chamber can be predetermined or calculated from the instant of firing of spark plug 20, while the area of port 16, which controls the surface of the merging flame front, should be as large as possible without producing premature local heating of the main quantity of mixture, so that the flame can instantly contact as great an amount as possible of the main quantity of combustible mixture.

The firing of central spark plug 21 in the main combustion space of cylinder 10 is adjusted to occur approximately at the time of the emergence of the flame from port 16. Since the flame emerging from port 16 is immediately subject to the swirling motion of the gas mixture in cylinder 10, it passes rapidly in the direction of outlet valve 26, and in a manner to avoid or minimize undesired spontaneous ignition of the mixture adjacent an outlet valve which may possibly have become overheated. From outlet valve 26, the flame zone R continues along the periphery of cylinder 10, while those portions of the combustible mixture in the central part of cylinder 10 are simultaneously ignited to form a circular and radially outwardly expanding flame front (as indicated in FIG. 2 by C and the straight arrows in the central unhatched portion).

Thus, an inwardly expanding annular flame front R ultimately meets an outwardly expanding central circular flame front C from spark plug 21 for extremely rapid combustion. Although a wide variety of total combustion speeds can readily be obtained by correlating the speed of swirling or rotating movement of the gas mixture and the timing of firing spark plugs 20 and 21. The preferred arrangement is to have the expanding combustion of the central zone of the gas mixture C complete at approximately the same time as flame ring R completes its travel around the entire periphery of cylinder 10 (as indicated in FIG. 3). In this manner, particularly because of the swirling or rotating advance of flame ring R, substantially complete removal of latent nests of combustible gas at the edge of cylinder 10 is obtained as another factor in preventing the characteristic Otto "knocking," and desirably complete flushing of ignition chamber 15 is also a result of the swirling movement of gas air mixture from inlet port 25 in anti clockwise direction according to the sketches.

In connection with the foregoing, it has been found that the results as obtained in accordance with this invention do not occur in the conventional Otto gas engine operation, even when using time staggered multiple ignition and artificial eddying, apparently as a result of the relatively large quantities of residual combustible mixture at the periphery and other spots of the combustion space, which quantities detonate in an irregular manner. By contrast, and in accordance herewith, the complete combustion is so rapidly accomplished as to be finished prior to "knocking" irregularities of any significant magnitude.

As illustrative of the foregoing, comparative data are graphically shown in FIGS. 5 and 6 with regard to, respectively, a conventional Otto gas cycle and operation in accordance herewith. Thus, the speed of heat release ($dQ/da$) is plotted against time expressed as degrees of crankshaft rotation, and in which Q is a quantity of heat and $a$ is time expressed in crank degrees. Comparison of FIGS. 5 and 6 clearly shows that the combustion of the cycle in accordance herewith is completed (point E FIG. 6) substantially prior to the time when "knocking" normally commences (point E FIG. 5) in the conventional Otto gas engine operation. Actually, as will be understood from the foregoing, if it is desired to prevent higher pressure peaks and excessive steepness of the course of combustion, the start of combustion can readily be controlled, in accordance with this invention, to take place later, and even without the uniformity of height of the pressure peak changing from one cycle to the next. This is an aspect of this invention which bears striking agreement with a pure diesel cycle.

Also, as will be understood from the foregoing, the higher combustion air ratios possible in accordance with this invention would not be desired normally in conventional Otto cycle operation because of the known situation where the efficiency rapidly becomes poor and the irregularity from cycle to cycle greater as the combustion air ratio is increased. Furthermore, the start of combustion in an engine operated in accordance with FIG. 5 must be considerablby earlier than in the case of the operation here in accordance with FIG. 6 in order for reasonable or optimum efficiency of the engine to be obtained. As a result, the "knocking" peaks occur in the region or at the times of higher cylinder pressures, and are thus accentuated to an impermissible point as a practical matter, entirely aside from other dangers of "knocking" in an Otto gas engine.

As will be understood from the foregoing, there is thus provided in accordance with this invention engine constructions and operation making it possible to change quite simply an readily from pure diesel operation to an Otto cycle with the same engine and yet with the Otto gas operation and combustion taking place uniformly and substantially free of characteristic Otto "knocks." At the same time, the efficiency of combustion can be increased by about 2% to 3% as compared with conventional Otto gas combustion methods, as a result of which the overall efficiency is substantially improved. With the swirling charging and control combustion of the air-gas combustible mixture as taught herein, possible premature reactions and delayed residual reactions are substantially eliminated or minimized, and the entire ignition and combustion is so accelerated as to be substantially completed before Otto "knocking" occurs or, at least, so that such "knocking" does not occur at a time in the cycle where it is accentuated by cylinder pressure to produce a hardness of operation exceeding the permissible limits of the particular engine structure involved. Although this invention is particularly adapted and satisfactory for application to engines primarily intended for conversion from diesel to Otto operation, it is apparent from the foregoing that the advantages hereof are equally applicable for engines intended only for Otto operation in view of the increased efficiencies and capacities thereof for a given size and weight of engine structure.

While the methods and apparatus herein disclosed form preferred embodiments of this invention, this invention is not limited to these precise methods and apparatus, and changes may be made therein without departing from the scope of this invention which is defined in the appended claims.

What is claimed is:

1. In internal combustion engine apparatus of the character described which can be readily converted from supercharged Otto gas operation to diesel-oil and diesel-gas operation and having an engine cylinder, a piston reciprocable in said cylinder, and a cylinder head disposed on said cylinder with valve-controlled inlet and outlet ports disposed therein, the combination which comprises a source of combustible gas mixture connected to said inlet port, an elongated substantially cylindrical ignition chamber extending upwardly and outwardly from said cylinder at the periphery thereof into said cylinder head and adjacent said outlet port and in flow communication with said cylinder through a port of relatively large cross section having gradually decreasing cross section from the said port to the opposite end thereof, spark means disposed in said ignition chamber at the end thereof opposite the said port thereof, means for firing said spark means, and swirl producing means in said inlet port for imparting a swirling movement to combustible gas mixture entering therethrough around the periphery of said cylinder and in a direction away from said ports of said ignition chamber whereby upon firing of said spark means a relatively small portion of said combustible gas mixture is ignited in the confines of said ignition chamber until such time as the flame front thereof progresses through said port thereof whereby a large cross section of ignited combustion gas is presented to the rotating movement thereof in said cylinder for the rapid and complete combustion of substantially all said combustible gas in said cylinder before knocking commences.

2. Apparatus as described in claim 1 which includes a second spark means disposed in said cylinder adjacent the center of the said head, and means for the sequential firing of said first and second spark means whereby the firing of the said second spark means occurs simultaneously with the emergence of the flame front of the said ignited combustion gas from said ignition chamber.

3. Apparatus as described in claim 2 in which said swirl producing means in said inlet port impart a swirling velocity to said combustible gas mixture around the periphery of said cylinder for providing a four to five times ignition velocity.

4. Apparatus as described in claim 1 in which the outlet valve is disposed in said cylinder head so that the swirling action imparted to said combustion gas by said swirl means conducts the enlarged ignited combustion gas flame front emitting from said ignition chamber over said outlet valve first so that the same swirling action imparted to said combustible gas serves before ignition to flush the receded ignition chamber during the flushing period of the piston cycle of said cylinder.

5. Apparatus as described in claim 1 in which said ignition chamber has a volume of between about 1% to 2% of the compression volume of the said cylinder.

6. Apparatus as described in claim 1 in which a plurality of ignition chambers are disposed around said cylinder and extending into said cylinder head.

7. Apparatus as described in claim 2 in which the electrodes o fthe said spark means extended substantially into said cylinder and said ignition chamber for the complete and copious surrounding of said spark means by said combustible mixture.

8. Apparatus as described in claim 2 in which a plurality of ignition chambers are disposed around said cylinder and extending into said cylinder head, and in which said means for firing said spark means in the said plurality of ignition chambers fires them selectively simultaneously or progressively.

9. In a method for operating diesel-oil and diesel-gas engines as supercharged Otto gas engines by increasing the speed of combustion and completing the combustion of combustible gases consumed in the cylinder thereof to a time before the knocking cycles thereof commences, the steps which comprise introducing a combustible gas mixture into said cylinder in a swirling rotating pattern around the periphery thereof at a point therealong before the point of ignition of the said gas mixture therein, initiating combustion of the said combustible gas mixture at the point when the piston in said cylinder reaches dead center of the compression stroke by igniting a portion only of said mixture separated from the said cylinder forming a flame front for igniting the remainder of said mixture in said cylinder, conducting said flame front of said ignited combustion mixture in an approximately annular pattern around the periphery of said cylinder towards the outlet valve thereof and also spreading inwardly from the inner front of the said annular flame.

10. A method as described in claim 9 in which the said combustible gas mixture is also ignited at a point substantially in the center of the said cylinder head simultaneously with the entry of the said flame front into said cylinder for imparting a second circular flame front of increasing size which extends outwardly in all directions from the point of ignition thereof to the also inwardly extending front of the said annular flame.

11. A method as described in claim 9 in which the volume of said portion of said mixture is between about 1% and 2% of the compression volume of the said cylinder.

12. A method as described in claim 9 in which the velocity of the swirling combustible gas introduced into said cylinder is sufficient to provide a four to five times ignition velocity for said combustible gas in the peripheric zone of the main combustion chamber.

13. A method as described in claim 10 in which ignition of said gas mixture is initiated at a plurality of points around the periphery of said chamber and in which each said ignition occurs simultaneously.

14. A method as described in claim 10 in which ignition of said gas mixture is initiated at a plurality of points around the periphery of said chamber and in which said ignitions occur in progression from point to point.

References Cited

UNITED STATES PATENTS

| | | | |
|---|---|---|---|
| 1,788,356 | 1/1931 | Dikeman | 123—155 |
| 2,029,581 | 2/1936 | Merriam | 123—191 |
| 3,244,159 | 4/1966 | Meurer | 123—32 |

FOREIGN PATENTS 462,605   8/1936   Great Britain.

RALPH D. BLAKESLEE, *Primary Examiner.*